(12) United States Patent
Lombardo (10) Patent No.: US 12,280,674 B2
(45) Date of Patent: *Apr. 22, 2025

(54) BATTERY MANAGEMENT SYSTEMS AND METHODS

(71) Applicant: Oshkosh Corporation, Oshkosh, WI (US)

(72) Inventor: David Lombardo, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,020

(22) Filed: Nov. 30, 2023

(65) Prior Publication Data

US 2024/0100962 A1    Mar. 28, 2024

Related U.S. Application Data

(60) Division of application No. 17/868,136, filed on Jul. 19, 2022, now Pat. No. 11,872,895, which is a
(Continued)

(51) Int. Cl.
*B60W 10/20* (2006.01)
*B60L 1/00* (2006.01)
(Continued)

(52) U.S. Cl.
CPC .......... *B60L 15/2045* (2013.01); *B60L 1/003* (2013.01); *B60L 1/02* (2013.01); *B60L 1/20* (2013.01);
(Continued)

(58) Field of Classification Search
CPC ...... H01M 50/20; H01M 10/635; B60K 1/04; B60L 58/27; B60L 58/14;
(Continued)

(56) References Cited

U.S. PATENT DOCUMENTS 5,388,400 A   2/1995  Hoppenstedt et al.
6,516,914 B1  2/2003  Andersen et al.
(Continued)

FOREIGN PATENT DOCUMENTS

CN   104718051 A    6/2015
CN   204897303 U   12/2015
(Continued)

OTHER PUBLICATIONS

Office Action issued in connection with Chinese Appl. No. 202080039564.X dated Dec. 29, 2023.
(Continued)

*Primary Examiner* — Jason D Shanske
*Assistant Examiner* — James J Triggs
(74) *Attorney, Agent, or Firm* — Foley & Lardner LLP (57) ABSTRACT

A rechargeable battery system for a lift device includes a battery configured to power at least one component of the lift device, a heating system configured to selectively provide heat to the battery, and a battery charger connected to the battery and to the heating system. The heating system is configured to selectively receive power from the battery through a battery power connection or from the battery charger through a battery charger power connection.

11 Claims, 13 Drawing Sheets

Related U.S. Application Data continuation of application No. 16/812,168, filed on Mar. 6, 2020, now Pat. No. 11,447,020.

(60) Provisional application No. 62/829,917, filed on Apr. 5, 2019.

(51) Int. Cl.
| | |
|---|---|
| *B60L 1/02* | (2006.01) |
| *B60L 15/20* | (2006.01) |
| *B60L 50/60* | (2019.01) |
| *B60L 53/31* | (2019.01) |
| *B60L 58/14* | (2019.01) |
| *B60L 58/27* | (2019.01) |
| *B62D 5/04* | (2006.01) |
| *B66F 9/24* | (2006.01) |
| *B66F 11/04* | (2006.01) |
| *H01M 10/635* | (2014.01) |

(52) U.S. Cl.
CPC ............... *B60L 50/66* (2019.02); *B60L 53/31* (2019.02); *B60L 58/14* (2019.02); *B60L 58/27* (2019.02); *B60W 10/20* (2013.01); *B62D 5/04* (2013.01); *B66F 9/24* (2013.01); *B66F 11/042* (2013.01); *H01M 10/635* (2015.04); *B60L 2240/549* (2013.01)

(58) Field of Classification Search
CPC .......... B60L 2240/549; B60L 15/2045; B60W 10/20; B62D 5/04; B62F 9/24
See application file for complete search history.

(56) References Cited

U.S. PATENT DOCUMENTS

| | | |
|---|---|---|
| 6,561,718 B1 | 5/2003 | Archer et al. |
| 6,764,085 B1 | 7/2004 | Anderson |
| 6,779,806 B1 | 8/2004 | Breitbach et al. |
| 6,883,815 B2 | 4/2005 | Archer |
| 6,976,688 B2 | 12/2005 | Archer et al. |
| 7,207,582 B2 | 4/2007 | Siebers et al. |
| 7,472,914 B2 | 1/2009 | Anderson et al. |
| 8,333,390 B2 | 12/2012 | Linsmeier et al. |
| 8,376,077 B2 | 2/2013 | Venton-Walters |
| 8,465,025 B2 | 6/2013 | Venton-Walters et al. |
| 8,596,648 B2 | 12/2013 | Venton-Walters et al. |
| 8,764,029 B2 | 7/2014 | Venton-Walters et al. |
| 8,801,017 B2 | 8/2014 | Ellifson et al. |
| 8,876,133 B2 | 11/2014 | Ellifson |
| 8,955,859 B1 | 2/2015 | Richmond et al. |
| 8,955,880 B2 | 2/2015 | Malcolm et al. |
| 8,991,834 B2 | 3/2015 | Venton-Walters et al. |
| 8,991,840 B2 | 3/2015 | Zuleger et al. |
| 9,016,703 B2 | 4/2015 | Rowe et al. |
| 9,045,014 B1 | 6/2015 | Verhoff et al. |
| 9,238,477 B2 | 1/2016 | Ahern et al. |
| 9,291,230 B2 | 3/2016 | Ellifson et al. |
| 9,327,576 B2 | 5/2016 | Ellifson |
| 9,329,000 B1 | 5/2016 | Richmond et al. |
| 9,434,321 B2 | 9/2016 | Perron et al. |
| 9,656,640 B1 | 5/2017 | Verhoff et al. |
| 9,669,679 B2 | 6/2017 | Zuleger et al. |
| 9,688,112 B2 | 6/2017 | Venton-Walters et al. |
| 9,764,613 B2 | 9/2017 | Rowe et al. |
| 9,809,080 B2 | 11/2017 | Ellifson et al. |
| 9,890,024 B2 | 2/2018 | Hao et al. |
| 10,144,389 B2 | 12/2018 | Archer et al. |
| 10,167,027 B2 | 1/2019 | Perron et al. |
| 10,221,055 B2 | 3/2019 | Hao et al. |
| 10,336,596 B2 | 7/2019 | Puszkiewicz et al. |
| 10,369,860 B2 | 8/2019 | Ellifson et al. |
| 10,392,056 B2 | 8/2019 | Perron et al. |
| 10,407,288 B2 | 9/2019 | Hao et al. |
| 10,421,332 B2 | 9/2019 | Venton-Walters et al. |
| 10,434,995 B2 | 10/2019 | Verhoff et al. |
| 10,457,533 B2 | 10/2019 | Puszkiewicz et al. |
| 10,464,389 B2 | 11/2019 | Zuleger et al. |
| 10,611,204 B1 | 4/2020 | Zhang et al. |
| 10,632,805 B1 | 4/2020 | Rositch et al. |
| 10,723,282 B2 | 7/2020 | Perron et al. |
| 11,447,020 B2 * | 9/2022 | Lombardo ............... B60L 7/10 |
| 2004/0035636 A1 | 2/2004 | Romain |
| 2006/0076427 A1 | 4/2006 | Schneider et al. |
| 2008/0280195 A1 | 11/2008 | Kumar et al. |
| 2009/0021221 A1 | 1/2009 | Krauer et al. |
| 2009/0283346 A1 | 11/2009 | Katae et al. |
| 2011/0198141 A1 | 8/2011 | Clark et al. |
| 2011/0288704 A1 | 11/2011 | Schwarz et al. |
| 2012/0043515 A1 * | 2/2012 | Finkbeiner ............... B66F 7/28 254/124 |
| 2015/0210520 A1 | 7/2015 | Ahern et al. |
| 2017/0081162 A1 | 3/2017 | Ahern et al. |
| 2019/0185301 A1 | 6/2019 | Hao et al. |
| 2019/0263252 A1 | 8/2019 | Hettrich et al. |
| 2019/0276102 A1 | 9/2019 | Zuleger et al. |
| 2019/0322512 A1 | 10/2019 | Puszkiewicz et al. |
| 2019/0337348 A1 | 11/2019 | Venton-Walters et al. |
| 2019/0337350 A1 | 11/2019 | Ellifson et al. |
| 2019/0344838 A1 | 11/2019 | Perron et al. |
| 2019/0351883 A1 | 11/2019 | Verhoff et al. |
| 2019/0352157 A1 | 11/2019 | Hao et al. |
| 2019/0381990 A1 | 12/2019 | Shukla et al. |
| 2020/0062071 A1 | 2/2020 | Zuleger et al. |
| 2020/0094671 A1 | 3/2020 | Wildgrube et al. |
| 2020/0140248 A1 | 5/2020 | Hackenberg et al. |
| 2020/0140249 A1 | 5/2020 | Hackenberg et al. |
| 2020/0212515 A1 | 7/2020 | King et al. |
| 2020/0277137 A1 | 9/2020 | Bastian et al. |

FOREIGN PATENT DOCUMENTS

| | | |
|---|---|---|
| CN | 106364394 A | 2/2017 |
| CN | 108100962 A | 6/2018 |
| CN | 109301908 A | 2/2019 |
| EP | 2 672 023 A1 | 12/2013 |
| EP | 2 712 046 A1 | 3/2014 |
| EP | 3 114 074 A1 | 1/2017 |
| GB | 2 502 060 A | 11/2013 |
| JP | 2003-199211 A | 7/2003 |
| JP | 2004-266917 A | 9/2004 |
| JP | 2010-041828 A | 2/2010 |
| JP | 2014-094802 A | 5/2014 |
| WO | WO-2015/134482 A1 | 9/2015 |

OTHER PUBLICATIONS

Anonymous: "Regenerative brake—Wikipedia, the free encyclopedia", Jun. 26, 2015, XP055301396, retrieved from the Internet: URL:https://en.wikipedia.org/w/index.php?title=Regenerative_brake &oldid=668739712 [retrieved on Sep. 9, 2016] last paragraph.
International Search Report and Written Opinion for International Application No. PCT/US2020/021580 dated Jul. 22, 2020, 19 pages.

* cited by examiner

BATTERY MANAGEMENT SYSTEMS AND METHODS

CROSS-REFERENCE TO RELATED APPLICATION

This application is a divisional of U.S. patent application Ser. No. 17/868,136, filed on Jul. 19, 2022, which is a continuation of U.S. patent application Ser. No. 16/812,168, filed on Mar. 6, 2020, which claims the benefit of U.S. Provisional Application No. 62/829,917, filed Apr. 5, 2019, the entire disclosures of which are incorporated herein by reference in their entireties.

BACKGROUND

Lift devices commonly include a vertically movable platform that is supported by a folding series of linked supports. The linked supports are arranged in an "X" pattern, crisscrossing with one another. A hydraulic cylinder generally controls vertical movement of the platform by engaging and rotating (i.e., unfolding) the lowermost set of linked supports, which in turn unfolds the remainder of the series of linked supports within the system. The platform raises and lowers based upon the degree of actuation by the hydraulic cylinder. A hydraulic cylinder may also control various other vehicle actions, such as, for example, steering or platform tilt functions. Lift devices using one or more hydraulic cylinders require an on-board reservoir tank to store hydraulic fluid for the lifting process.

SUMMARY

One exemplary embodiment relates to a lift device. The lift device comprises a base, a drive motor, a steering system, a linear actuator, a battery, and a control system. The base has a plurality of wheels. The drive motor is configured to rotate at least one wheel of the plurality of wheels to propel the lift device. The steering system is operably coupled to at least one of the plurality of wheels to steer the lift device. The linear actuator is configured to selectively move a work platform configured to support a load between a raised position and a lowered position. The linear actuator has an electric motor. The battery is configured to selectively apply power to the linear actuator and the drive motor. The control system is configured to manage a battery usage of the battery during operation. The control system comprises a vehicle controller and a lift controller. The vehicle controller is in communication with the drive motor, the steering system, and the battery. The lift controller is in communication with the vehicle controller and the linear actuator. At least one of the vehicle controller and the lift controller is configured to receive current delivery limits and regeneration limits of the battery and to limit operational speeds of at least one of the drive motor, the steering system, and the linear actuator based on the current delivery limits and the regeneration limits.

Another exemplary embodiment relates to a lift device. The lift device comprises a base, a linear actuator, and a rechargeable battery system. The base has a plurality of wheels. The linear actuator is configured to selectively move a work platform configured to support a load between a raised position and a lowered position. The linear actuator has an electric motor. The rechargeable battery system includes a battery, a heating system, and a battery charger. The battery is configured to power the electric motor of the linear actuator. The heating system is configured to selectively provide heat to the battery. The battery charger is configured to selectively charge the battery and to selectively charge the heating system. The heating system is configured to receive power from the battery through a battery power connection and to receive power from the battery charger through a battery charger power connection.

Another exemplary embodiment relates to a rechargeable battery system for a lift device. The rechargeable battery system comprises a battery, a heating system, and a battery charger. The battery is configured to power at least one component of the lift device. The heating system is configured to selectively provide heat to the battery. The battery charger is configured to selectively charge the battery and to selectively charge the heating system. The heating system is configured to selectively receive power from the battery through a battery power connection and to selectively receive power from the battery charger through a battery charger power connection.

Another exemplary embodiment relates to a lift device. The lift device includes a linear actuator configured to selectively move a work platform between a raised position and a lowered position, and a rechargeable battery system having a battery, a heating system, and a battery charger. The linear actuator includes an electric motor. The battery is configured to power the electric motor of the linear actuator. The battery charger is configured to simultaneously charge the battery and provide power the heating system to heat the battery.

Another exemplary embodiment relates to a rechargeable battery system for a lift device. The rechargeable battery system includes a battery configured to power at least one component of the lift device, a heating system configured to selectively provide heat to the battery, and a battery charger connected to the battery and to the heating system. The heating system is configured to selectively receive power from the battery through a battery power connection or from the battery charger through a battery charger power connection.

Another exemplary embodiment relates to a method of operating a lift device. The lift device includes a drive motor configured to rotate at least one wheel, a steering system, and a lift actuator configured to selectively move a work platform between a raised position and a lowered position. The method includes receiving, at a controller, current delivery limits and regenerations limits for a battery that powers the drive motor, the steering system, and the lift actuator, and limiting an operational speed of the drive motor or the lift actuator based on the current delivery limits and the regeneration limits.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to a rechargeable battery system and a control system for a lift device. The rechargeable battery system includes a heating system configured to receive power selectively from either of an onboard battery or a battery charger. The control system is configured to scale or limit operation of the lift device based on current delivery limits and regeneration limits of the battery.

Figure 1A:
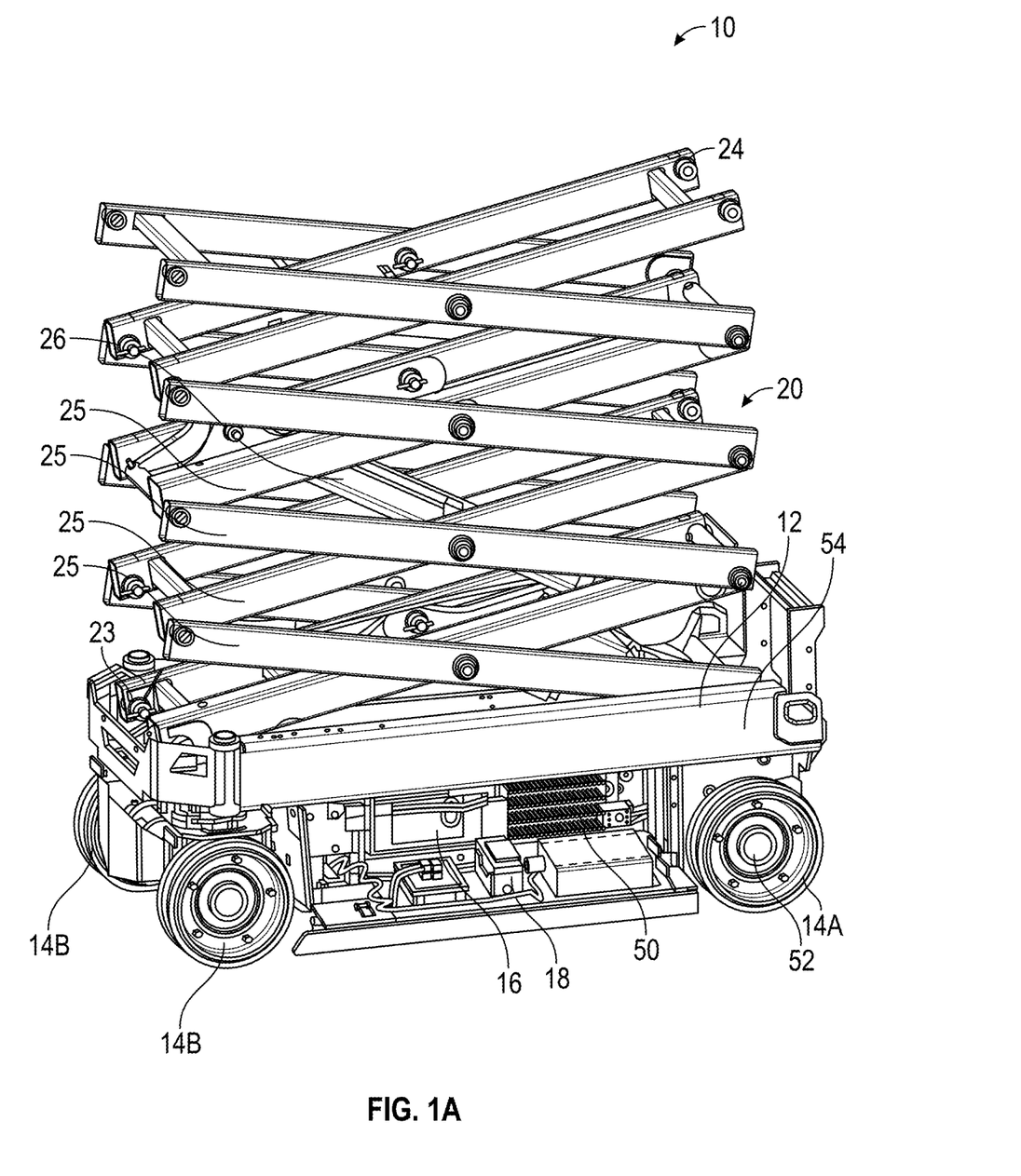
FIG. 1A is a side perspective view of a lift device in the form of a scissor lift, according to an exemplary embodiment.
Figure 1B:
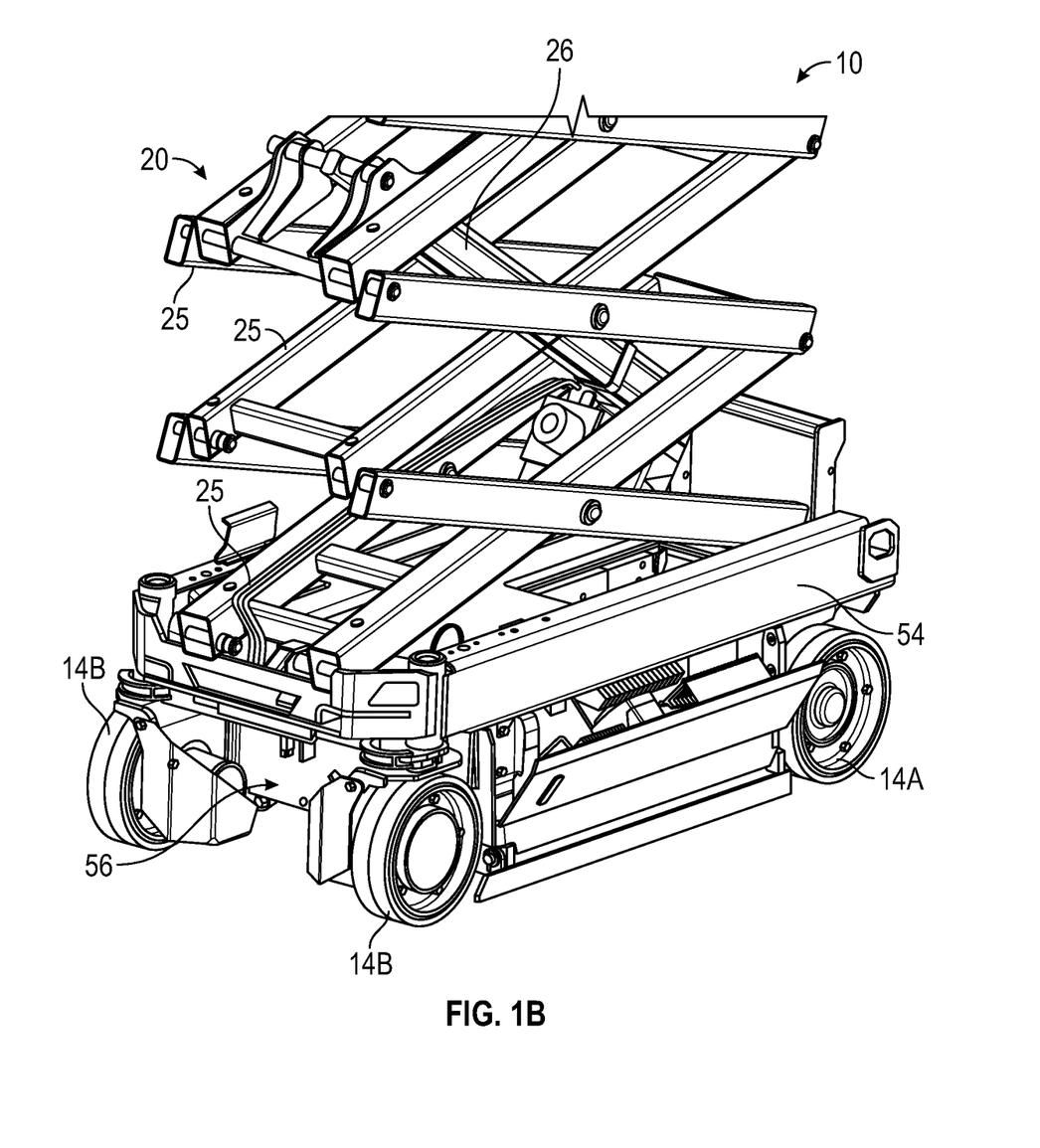
FIG. 1B is another side perspective view of the lift device of FIG. 1A.

According to the exemplary embodiment depicted in FIGS. 1A and 1B, a vehicle, shown as vehicle 10, is illustrated. In some embodiments, the vehicle 10 may be a scissor lift, for example, which can be used to perform a variety of different tasks at various elevations. The vehicle 10 includes a base 12 supported by wheels 14A, 14B positioned about the base 12. The vehicle 10 further includes a battery 16 positioned on board the base 12 of the vehicle 10 to supply electrical power to various operating systems present on the vehicle 10.

The battery 16 can be a rechargeable lithium-ion battery, for example, which is capable of supplying a direct current (DC) or alternating current (AC) to vehicle 10 controls, motors, actuators, and the like. The battery 16 can include at least one input 18 capable of receiving electrical current to recharge the battery 16. In some embodiments, the input 18 is a port capable of receiving a plug in electrical communication with an external power source, like a wall outlet. The battery 16 can be configured to receive and store electrical current from one of a traditional 120 V outlet, a 240 V outlet, a 480 V outlet, an electrical power generator, or another suitable electrical power source.

Figure 2A:
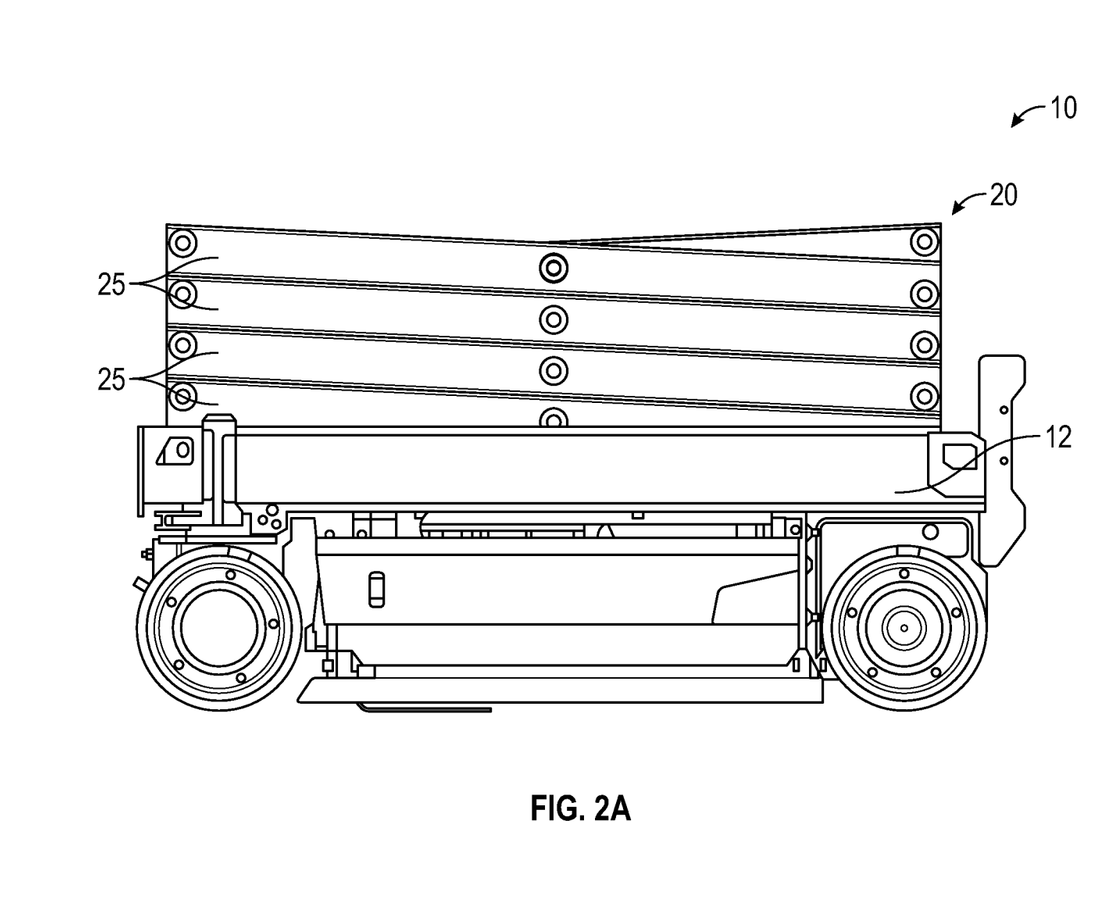
FIG. 2A is a side view of the lift device of FIG. 1A, shown in a retracted or stowed position.

The vehicle 10 further includes a retractable lifting mechanism, shown as a scissor lift mechanism 20, coupled to the base 12. The scissor lift mechanism 20 supports a work platform 22 (shown in FIG. 3). As depicted, a first end 23 of the scissor lift mechanism 20 is anchored to the base 12, while a second end 24 of the scissor lift mechanism 20 supports the work platform 22. As illustrated, the scissor lift mechanism 20 is formed of a foldable series of linked support members 25. The scissor lift mechanism 20 is selectively movable between a retracted or stowed position (shown in FIG. 2A) and a deployed or work position (shown in FIG. 2B) using an actuator, shown as linear actuator 26. The linear actuator 26 is an electric actuator. The linear actuator 26 controls the orientation of the scissor lift mechanism 20 by selectively applying force to the scissor lift mechanism 20. When a sufficient force is applied to the scissor lift mechanism 20 by the linear actuator 26, the scissor lift mechanism 20 unfolds or otherwise deploys from the stowed or retracted position into the work position. Because the work platform 22 is coupled to the scissor lift mechanism 20, the work platform 22 is also raised away from the base 12 in response to the deployment of the scissor lift mechanism 20.

Figure 3:
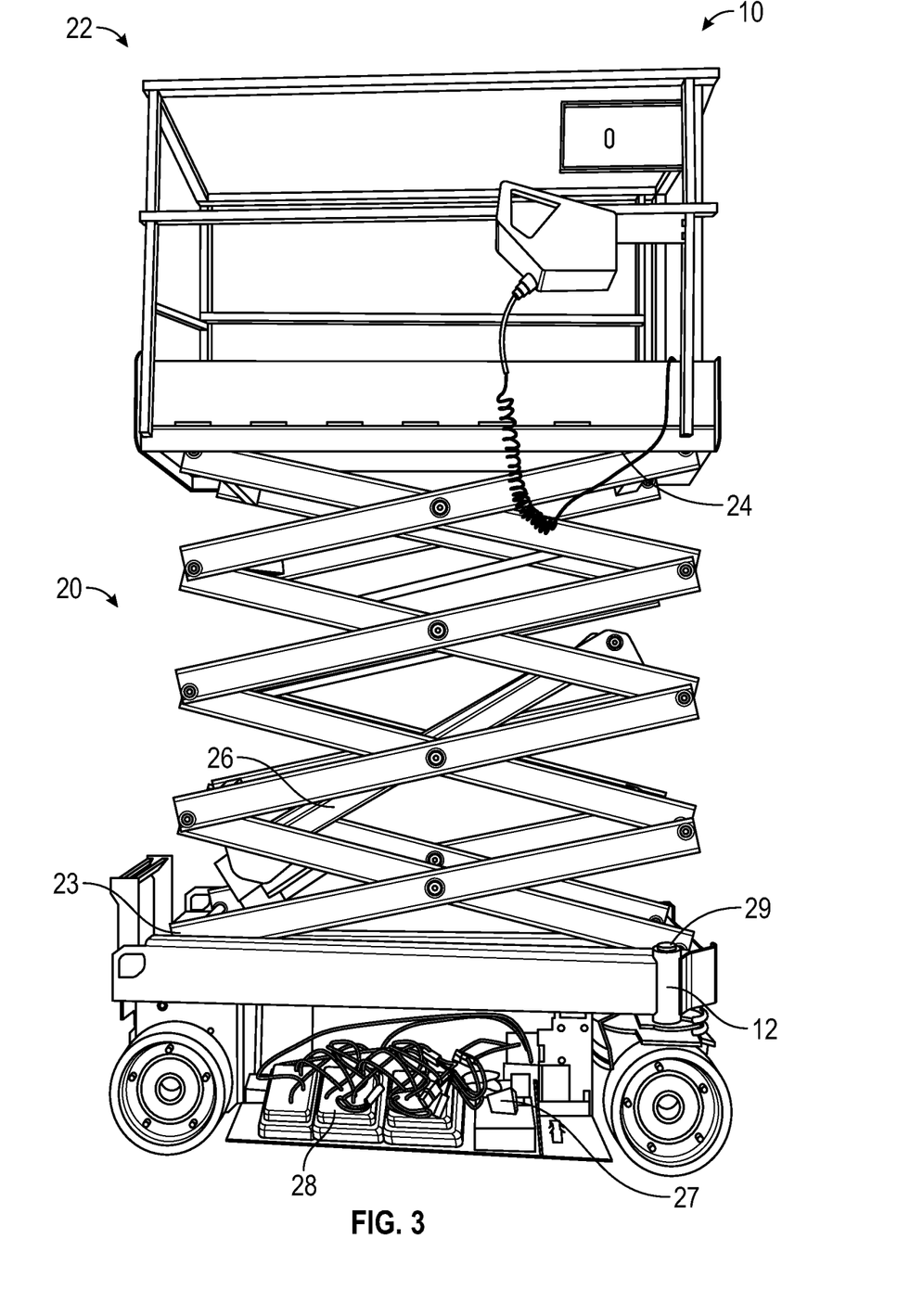
FIG. 3 is a side view of the lift device of FIG. 1A, depicting various vehicle controllers.

As shown in FIG. 3, the vehicle 10 further includes a vehicle controller 27 and a lift controller 28. The vehicle controller 27 is in communication with the lift controller 28. The lift controller 28 is in communication with the linear actuator 26 to control the movement of the scissor lift mechanism 20. Communication between the lift controller 28 and the linear actuator 26 and/or between the vehicle controller 27 and the lift controller 28 can be provided through a hardwired connection, or through a wireless connection (e.g., Bluetooth, Internet, cloud-based communication system, etc.). It should be understood that each of the vehicle controller 27 and the lift controller 28 includes various processing and memory components configured to perform the various activities and methods described herein. For example, in some instances, each of the vehicle controller 27 and the lift controller 28 includes a processing circuit having a processor and a memory. The memory is configured to store various instructions configured to, when executed by the processor, cause the vehicle 10 to perform the various activities and methods described herein.

In some embodiments, the vehicle controller 27 may be configured to limit the drive speed of the vehicle 10 depending on a height of the work platform 22. That is, the lift controller 28 may be in communication with a scissor angle sensor 29 configured to monitor a lift angle of the bottommost support member 25 with respect to the base 12. Based on the lift angle, the lift controller 28 may determine the current height of the work platform 22. Using this height, the vehicle controller 27 may be configured to limit or proportionally reduce the drive speed of the vehicle 10 as the work platform 22 is raised. That is, in some instances, as the work platform 22 is raised higher, the reduction of the drive speed also increases at a proportional amount.

Figure 2B:
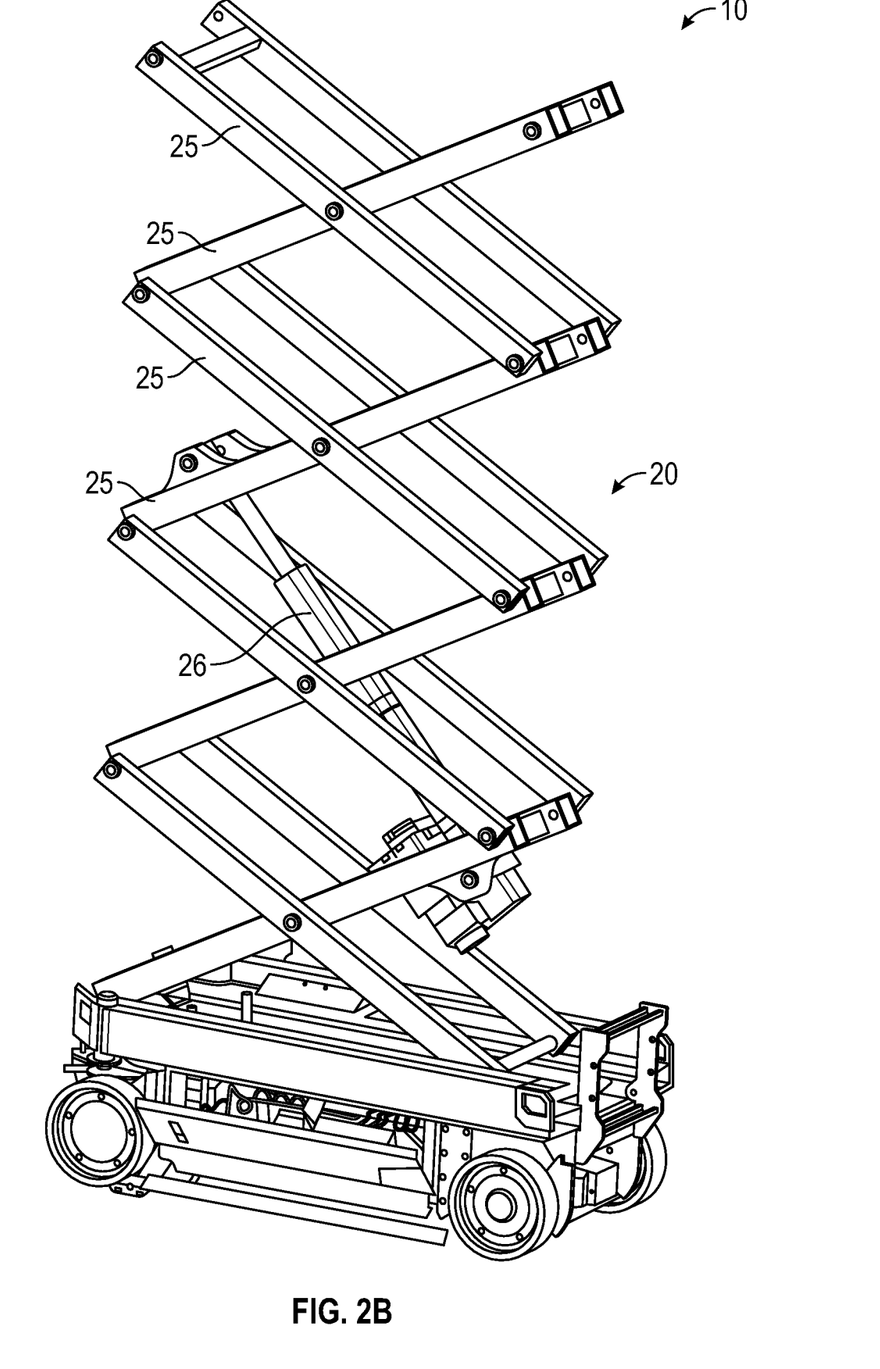
FIG. 2B is a side perspective view of the lift device of FIG. 1A, shown in an extended or work position.
Figure 4:
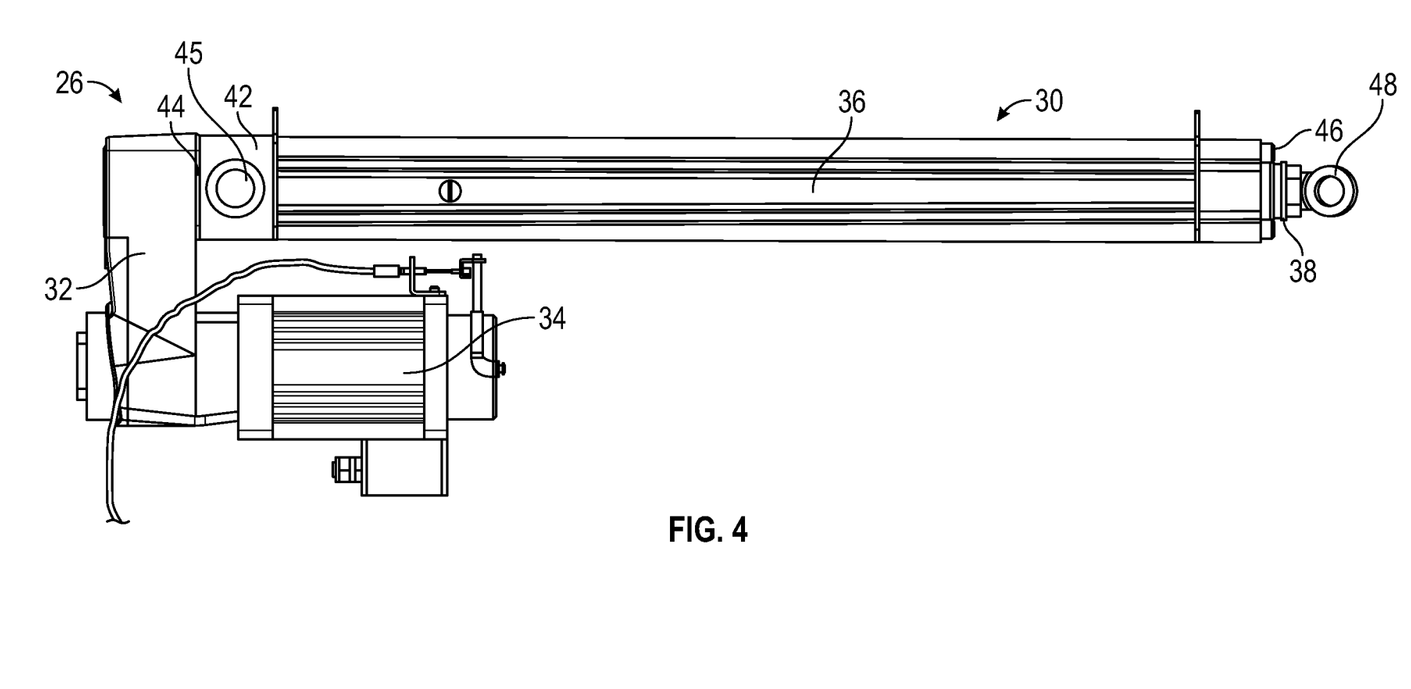
FIG. 4 is a side view of a linear actuator of the lift device of FIG. 1A.
Figure 5:
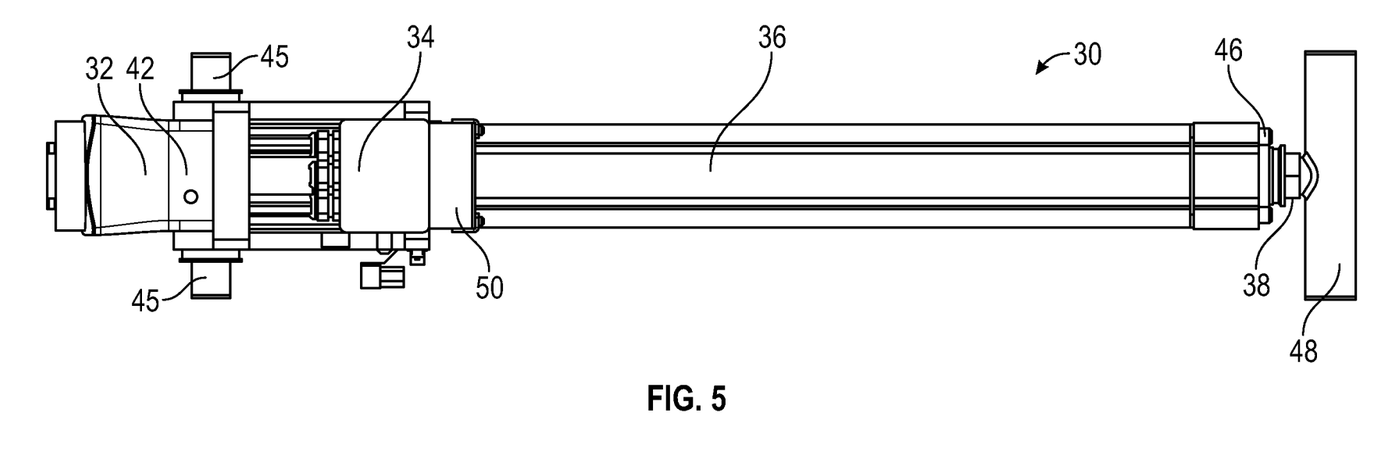
FIG. 5 is a bottom view of the linear actuator of FIG. 4.
Figure 6:
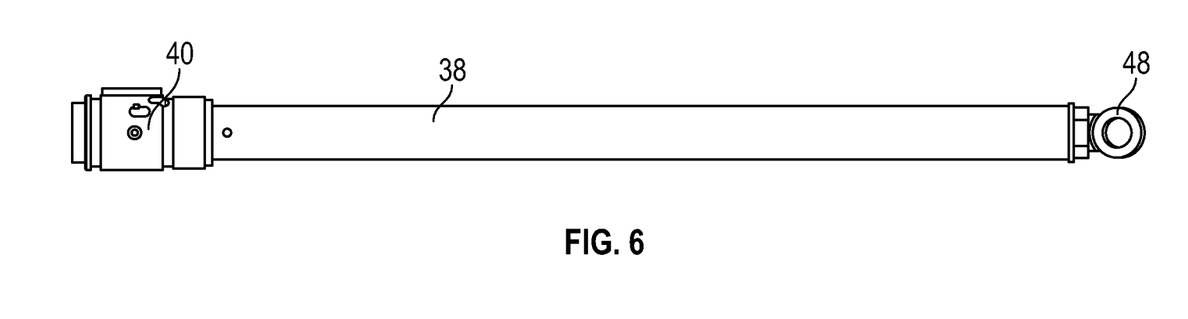
FIG. 6 is a side view of a push tube and a nut assembly of the linear actuator of FIG. 4.

As illustrated in the exemplary embodiment provided in FIGS. 4-6, the linear actuator 26 includes a push tube assembly 30, a gear box 32, and an electric motor 34. The push tube assembly 30 includes a protective outer tube 36 (shown in FIGS. 4 and 5), an inner push tube 38, and a nut assembly 40 (shown in FIG. 6). The protective outer tube 36 has a trunnion connection portion 42 disposed at a proximal end 44 thereof. The trunnion connection portion 42 is rigidly coupled to the gear box 32, thereby rigidly coupling the protective outer tube 36 to the gear box 32. The trunnion connection portion 42 further includes a trunnion mount 45 that is configured to rotatably couple the protective outer tube 36 to one of the support members 25 (as shown in FIG. 2B).

The protective outer tube 36 further includes an opening at a distal end 46 thereof. The opening of the protective outer tube 36 is configured to slidably receive the inner push tube 38. The inner push tube 38 includes a connection end, shown as trunnion mount 48, configured to rotatably couple the inner push tube 38 to another one of the support members 25 (as shown in FIG. 2B). As will be discussed below, the inner push tube 38 is slidably movable and selectively actuatable between an extended position (shown in FIG. 2B) and a retracted position (shown in FIG. 4).

Referring now to FIG. 6, the inner push tube 38 is rigidly coupled to the nut assembly 40, such that motion of the nut assembly 40 results in motion of the inner push tube 38. The inner push tube 38 and the nut assembly 40 envelop a central screw rod. The central screw rod is rotatably engaged with the gear box 32 and is configured to rotate within the inner push tube 38 and the nut assembly 40, about a central axis of the push tube assembly 30. The nut assembly 40 is configured to engage the central screw rod and translate the rotational motion of the central screw rod into translational motion of the inner push tube 38 and the nut assembly 40, with respect to the central screw rod, along the central axis of the push tube assembly 30.

Referring again to FIG. 4, the electric motor 34 is configured to selectively provide rotational actuation to the gear box 32. The rotational actuation from the electric motor 34 is then translated through the gear box 32 to selectively rotate the central screw rod of the push tube assembly 30. The rotation of the central screw rod is then translated by the nut assembly 40 to selectively translate the inner push tube 38 and the nut assembly 40 along the central axis of the push tube assembly 30. Accordingly, the electric motor 34 is configured to selectively actuate the inner push tube 38 between the extended position and the retracted position. Thus, with the trunnion mount 45 of the protective outer tube 36 and the trunnion mount 48 of the inner push tube 38 each rotatably coupled to their respective support members 25, the electric motor 34 is configured to selectively move the scissor lift mechanism 20 to various heights between and including the retracted or stowed position and the deployed or work position.

The electric motor 34 may be an AC motor (e.g., synchronous, asynchronous, etc.) or a DC motor (shunt, permanent magnet, series, etc.). In some instances, the electric motor 34 is in communication with and powered by the battery 16. In some other instances, the electric motor 34 may receive electrical power from another electricity source on board the vehicle 10.

Referring again to FIGS. 1A and 1B, the battery 16 can also supply electrical power to a drive motor 50 to propel the vehicle 10. The drive motor 50 may similarly be an AC motor (e.g., synchronous, asynchronous, etc.) or a DC motor (shunt, permanent magnet, series, etc.) for example, which receives electrical power from the battery 16 or another electricity source on board the vehicle 10 and converts the electrical power into rotational energy in a drive shaft. The drive shaft can be used to drive the wheels 14A, 14B of the vehicle 10 using a transmission. The transmission can receive torque from the drive shaft and subsequently transmit the received torque to a rear axle 52 of the vehicle 10. Rotating the rear axle 52 also rotates the rear wheels 14A on the vehicle 10, which propels the vehicle 10.

The rear wheels 14A of the vehicle 10 can be used to drive the vehicle, while the front wheels 14B can be used to steer the vehicle 10. In some embodiments, the rear wheels 14A are rigidly coupled to the rear axle 52, and are held in a constant orientation relative to the base 12 of the vehicle 10 (e.g., approximately aligned with an outer perimeter 54 of the vehicle 10). In contrast, the front wheels 14B are pivotally coupled to the base 12 of the vehicle 10. The wheels 14B can be rotated relative to the base 12 to adjust a direction of travel for the vehicle 10. Specifically, the front wheels 14B can be oriented using an electrical steering system 56. In some embodiments, the steering system 56 may be completely electrical in nature, and may not include any form of hydraulics.

Figure 7:
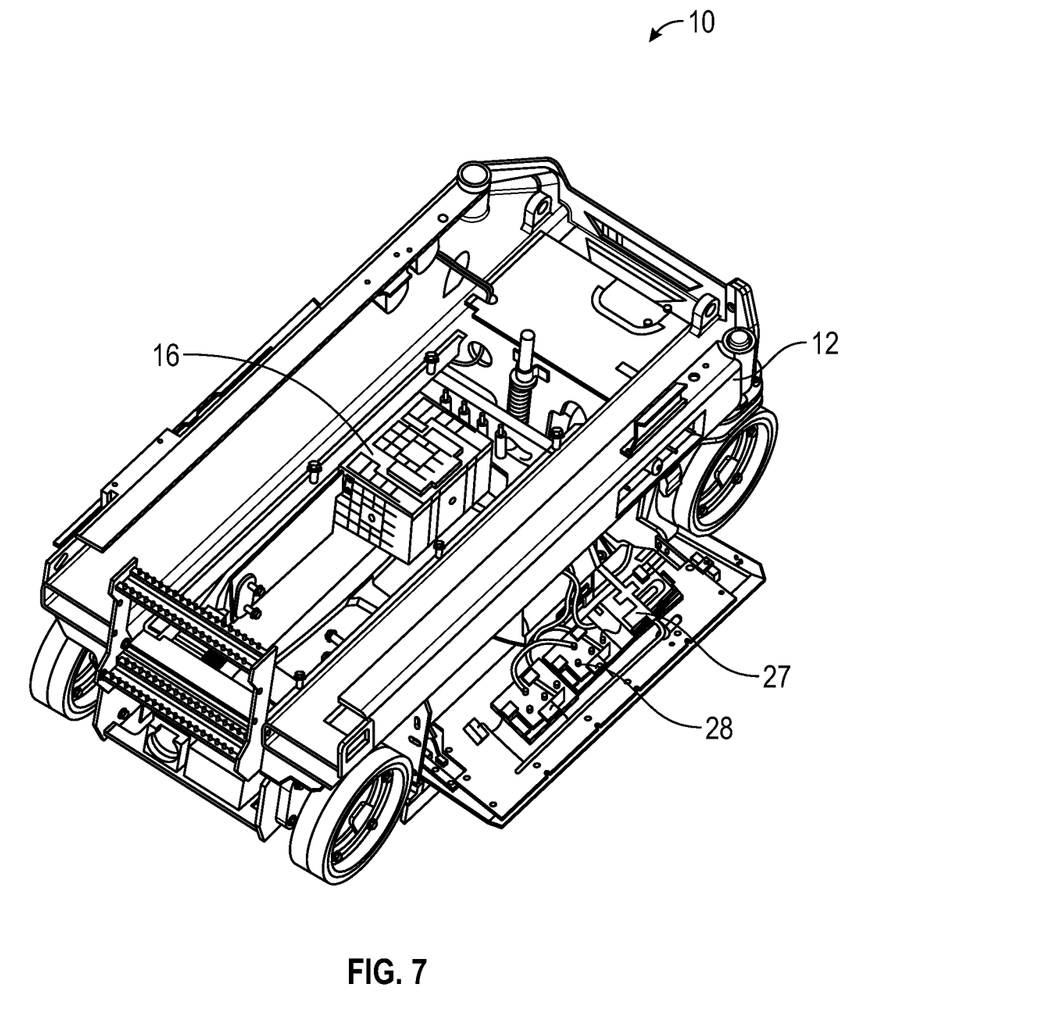
FIG. 7 is a top perspective view of a base of the lift device of FIG. 1A, shown in isolation.
Figure 8:
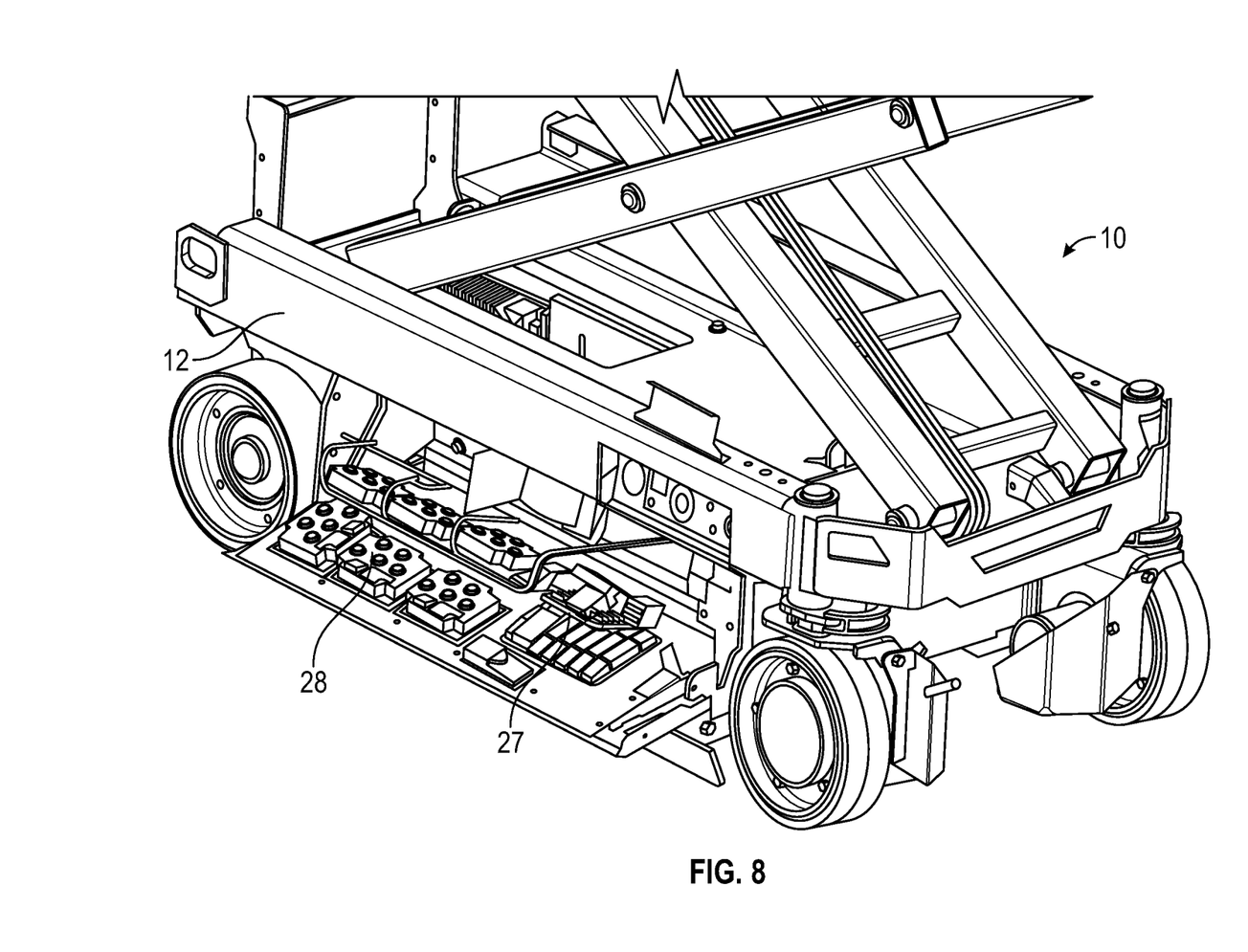
FIG. 8 is a side perspective view of the base of the lift device of FIG. 1A.
Figure 9:
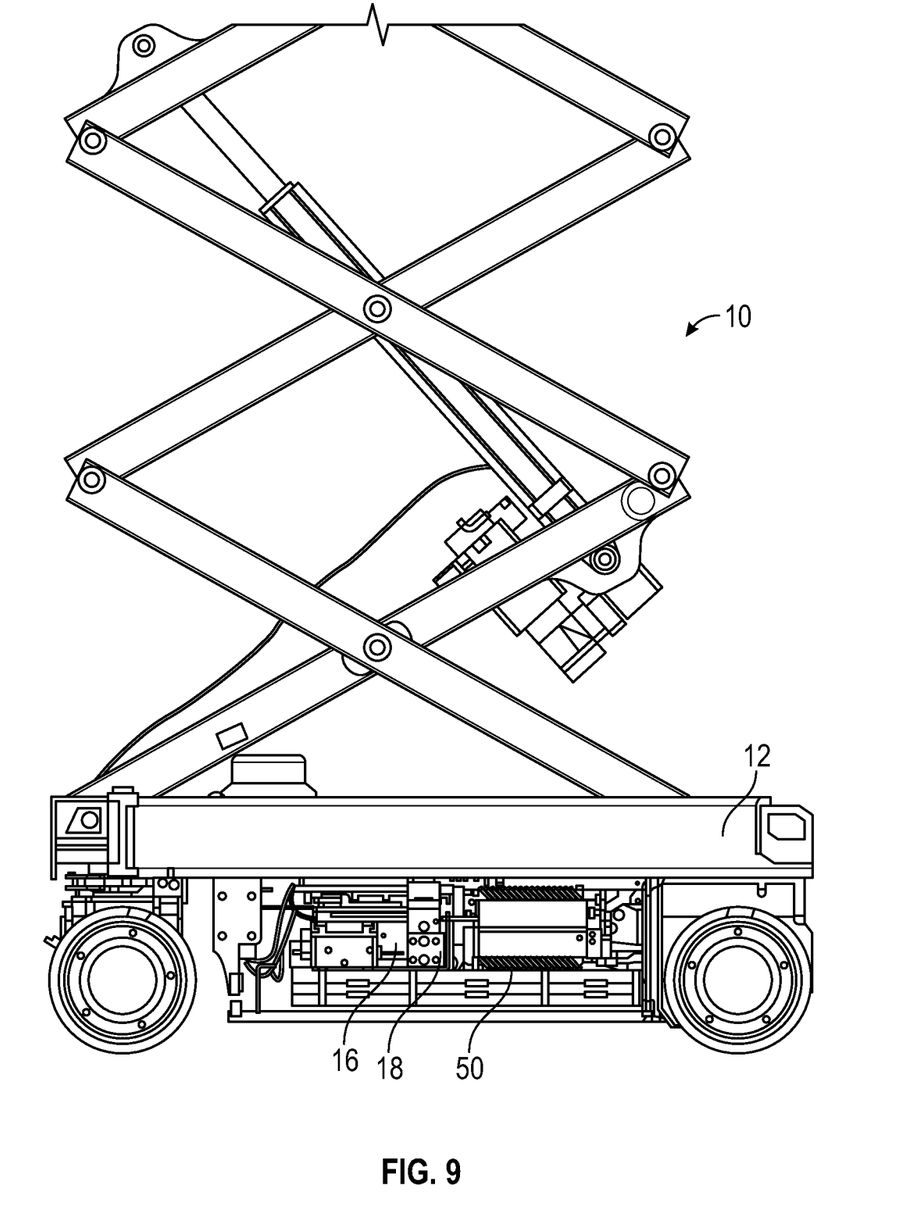
FIG. 9 is a side view of the base of the lift device of FIG. 1A.

Referring now to FIGS. 7-9, the battery 16 is shown connected to various controllers, actuators, and motors of the vehicle 10. As alluded to above, the battery 16 can be a rechargeable lithium-ion battery, for example, which is capable of supplying a direct current (DC) or and alternating current (AC) to the various controllers, actuators, and motors of the vehicle 10 as necessary during operation.

Figure 10:
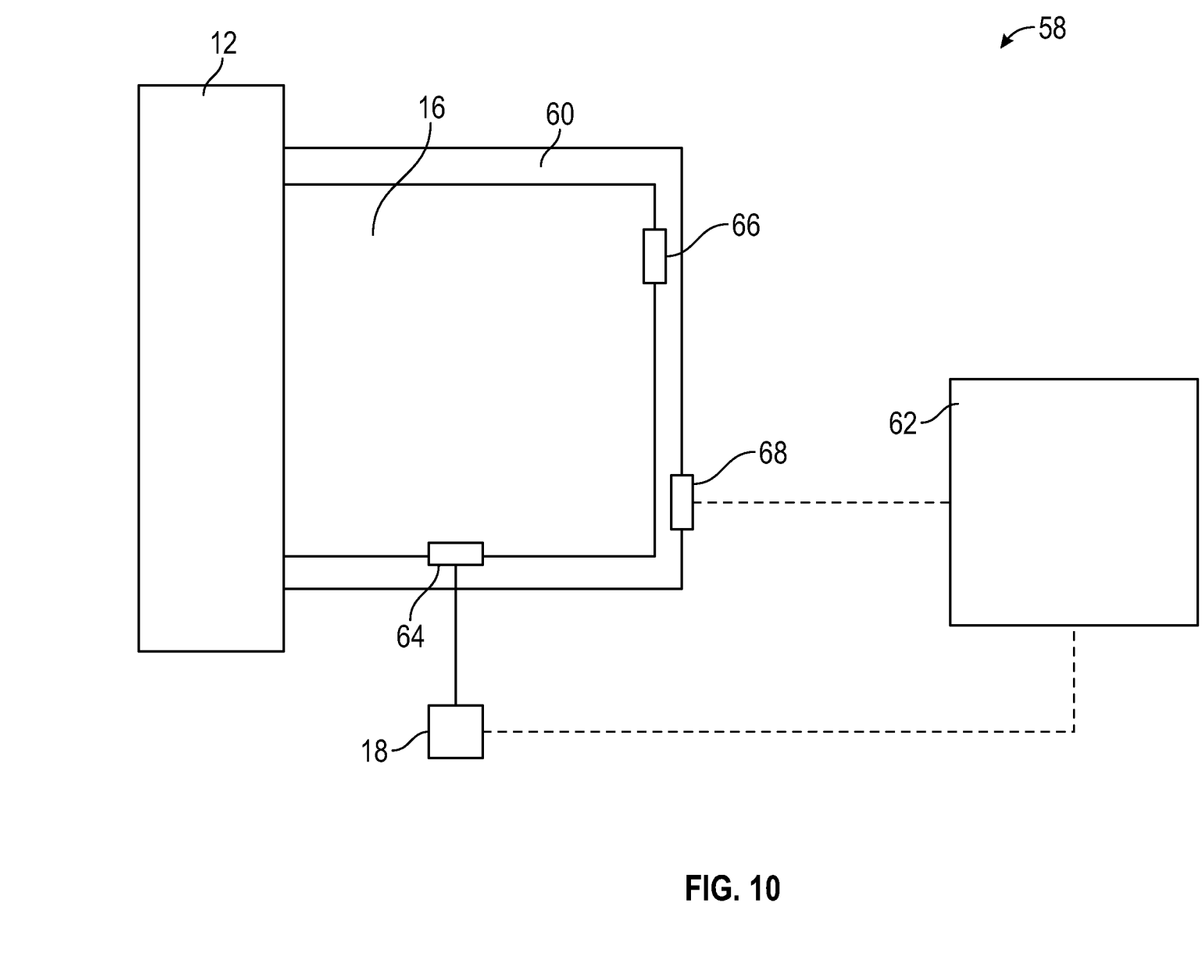
FIG. 10 is a schematic view of a rechargeable battery system of the lift device of FIG. 1A.

Referring now to the exemplary embodiment depicted in FIG. 10, a rechargeable battery system 58 is depicted. The rechargeable battery system 58 includes the battery 16, a heating system, shown as a blanket heater 60, and a battery charger 62. The battery 16 may be charged by the battery charger 62 through the input 18, which may be connected to the battery 16 through an input connector 64.

The blanket heater 60 is configured to selectively provide heat to the battery 16 when the vehicle 10 is experiencing cold temperatures (e.g., when the ambient temperature is at or below zero degrees Celsius) to increase the operating or charging efficiency of the battery 16. To this end, the vehicle controller 27 may be in communication with one or more temperature sensors. The blanket heater 60 is configured to be selectively powered by either the battery 16 or the battery charger 62. Specifically, the blanket heater 60 may be selectively powered by the battery 16 through a battery power connection 66. Alternatively, the blanket heater 60 may be selectively powered directly by the battery charger 62 through a battery charger power connection 68. The battery charger 62 is configured to apply power selectively to the battery 16 and/or the blanket heater 60. That is, the battery charger 62 is configured to individually apply power to the battery 16 or the blanket heater 60, or to simultaneously apply power to the battery 16 and the blanket heater 60 to both heat and charge the battery 16 simultaneously. Accordingly, in some instances, the battery 16 and the blanket heater 60 are charged simultaneously using only a single power source providing power to the battery charger 62.

Traditionally, battery heating systems for the onboard batteries of lift devices have been powered devices that require an external power source (e.g., a 120V source). As such, while charging the battery, the battery charger and the heating system have required separate power sources. The rechargeable battery system 58 allows the battery 16 to be heated by the blanket heater 60 and charged by the battery charger 62 simultaneously using only a single power source providing power to the battery charger 62.

Further, heating the battery 16 during use also increases the efficiency of the battery 16. The rechargeable battery system 58 allows for the blanket heater 60 to provide heat to the battery 16 without the need for an external power source. For example, in some embodiments, the vehicle controller 27 may be configured to automatically turn the blanket heater 60 on when the vehicle 10 is experiencing cold temperatures (e.g., when the ambient temperature is at or below zero degrees Celsius).

Figure 11:
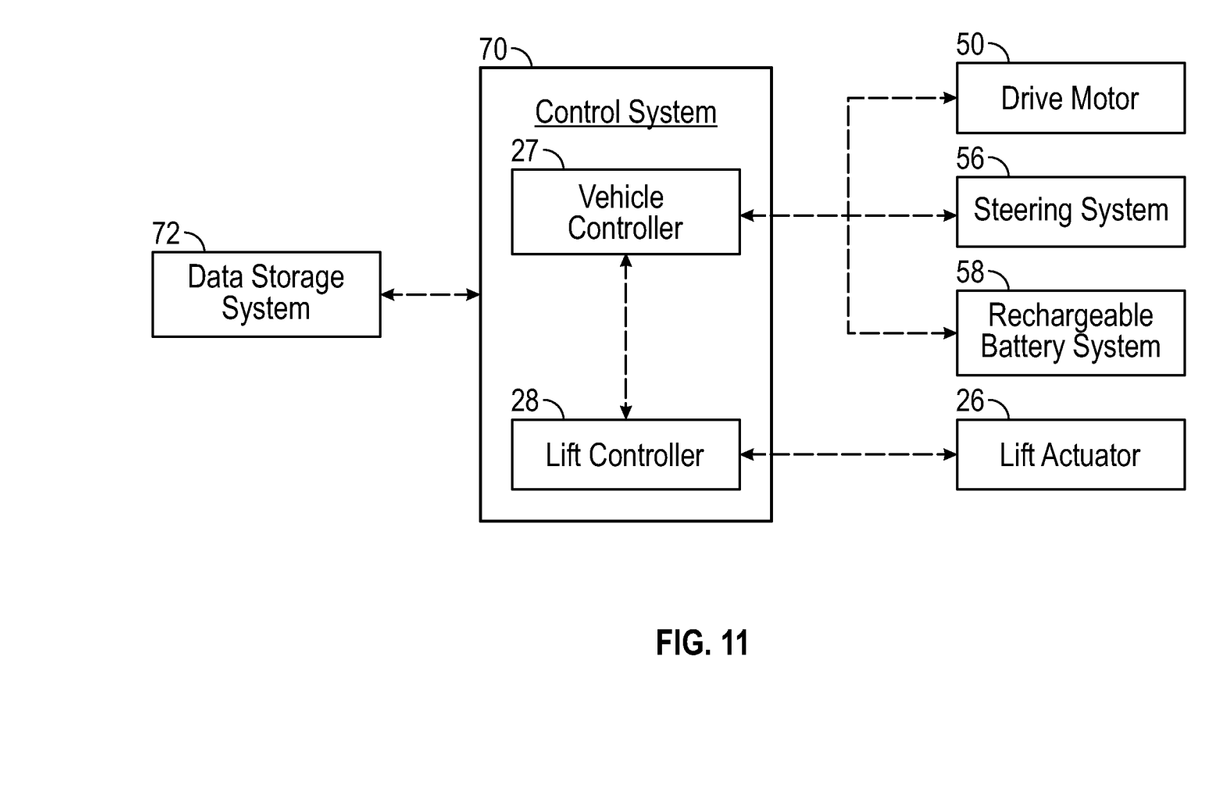
FIG. 11 is a schematic view of an exemplary control system configured for used with the lift device of FIG. 1A.

Referring now to FIG. 11, an exemplary control system 70 is illustrated. The control system 70 includes the vehicle controller 27 and the lift controller 28. The control system 70 may be in communication with a data storage system 72 configured to receive, store, and transmit various vehicle information to the control system 70 to aid in various vehicle operations. In some embodiments, the data storage system 72 may be an onboard data storage system disposed on the vehicle 10. In some other embodiments, the data storage system 72 can be a remote data storage system configured to communicate with the control system 70 through a hardwired connection or through a wireless connection (e.g., Bluetooth, Internet, cloud-based communication system, etc.).

As illustrated, the vehicle controller 27 is in communication with the drive motor 50, the steering system 56, and the rechargeable battery system 58. The lift controller 28 is in communication with the linear actuator 26. As mentioned above, the vehicle controller 27 is in communication with the lift controller 28. Communication between the various components of vehicle 10 and the control system 70 may similarly be provided through a hardwired connection, or through a wireless connection (e.g., Bluetooth, Internet, cloud-based communication system, etc.). It should be noted that, in some embodiments, the control system 70 may also include additional controllers configured to control or operate various additional functions and/or systems of the vehicle 10.

The control system 70 is configured, in part, to effectively manage the use and charging of the battery 16. Lithium ion batteries have various current delivery limits and regeneration limits based on a number of factors (e.g., specific electrode materials, size, configuration, temperature, etc.). The control system 70 is configured to receive the current delivery limits and regeneration limits of the battery 16 from the various vehicle components (e.g., the drive motor 50, the steering system 56, the linear actuator 26) via a controller area network (CAN) bus on the vehicle 10. The control system 70 may then use the various limit information received from the vehicle components, along with information received from the data storage system 72, to effectively scale and/or limit requested operational speeds (e.g., drive speed and lift speed) of various vehicle components (e.g., the drive motor 50, the steering system 56, the linear actuator 26) in order to stay within the allowable battery current limits. As such, the vehicle 10 (e.g., the drive motor 50, the steering system 56, the linear actuator) may continue to operate in a limited or scaled capacity when normal operational speeds would cause an over-current shutdown fault within the battery 16.

Figure 12:
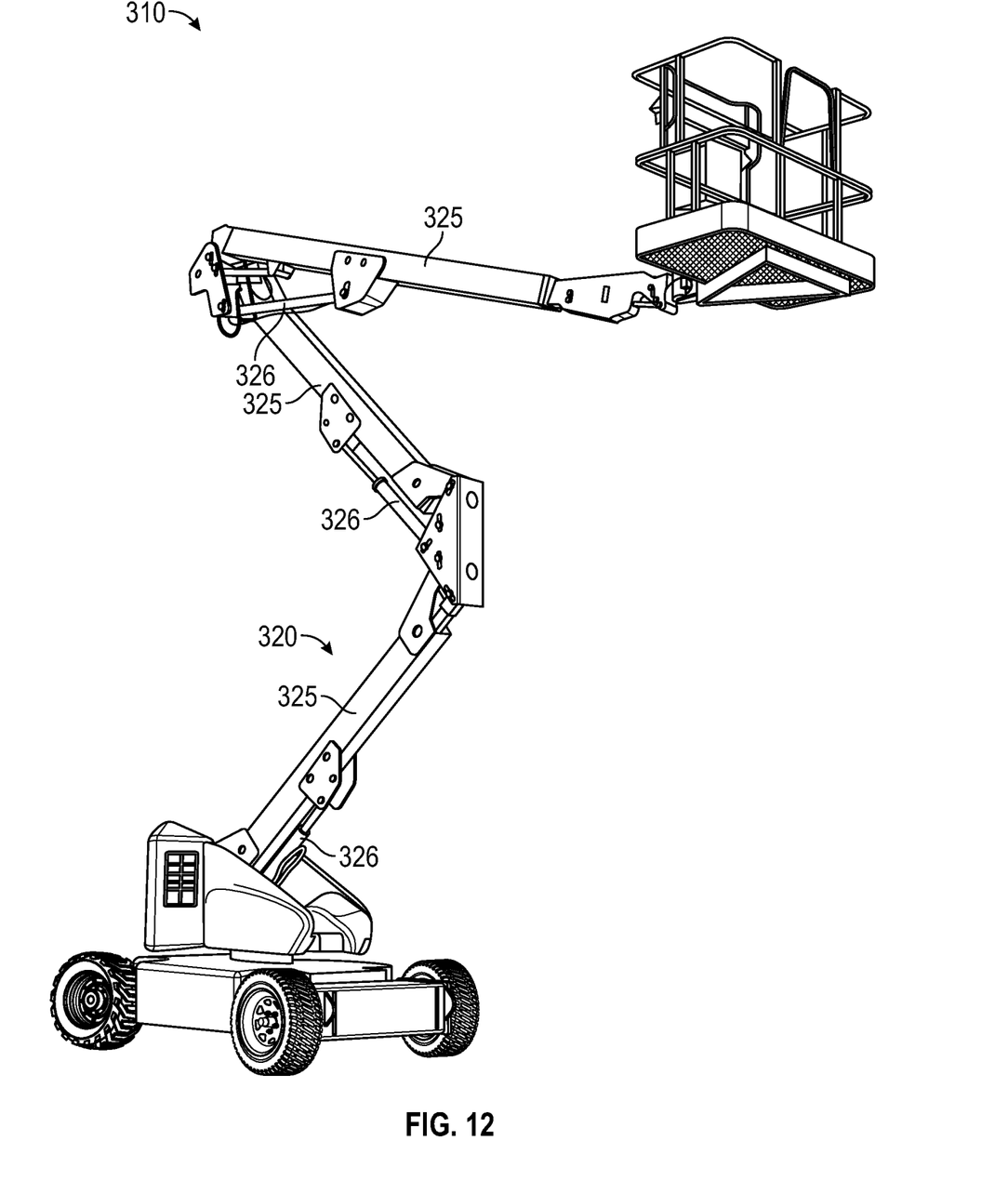
FIG. 12 is a side perspective view of another lift device in the form of a boom lift, according to another exemplary embodiment.

It should be appreciated that, while the retractable lift mechanism included on vehicle 10 is a scissor lift mechanism, in some instances, a vehicle may be provided that alternatively includes a retractable lift mechanism in the form of a boom lift mechanism. For example, in the exemplary embodiment depicted in FIG. 12, a vehicle, shown as vehicle 310, is illustrated. The vehicle 310 includes a retractable lift mechanism, shown as boom lift mechanism 320. The boom lift mechanism 320 is similarly formed of a foldable series of linked support members 325. The boom lift mechanism 320 is selectively movable between a retracted or stowed position and a deployed or work position using a plurality of actuators 326. Each of the plurality of actuators 326 is a linear actuator similar to the linear actuator 26.

It should be further appreciated that the linear actuators used in the lift mechanism 20, 320 and the steering system 56, and/or the rechargeable battery system 58 may be incorporated into nearly any type of electric vehicle. For example, the electric systems described herein can be incorporated into, for example, a scissor lift, an articulated boom, a telescopic boom, or any other type of aerial work platform. Additionally, the rechargeable battery system 58 may be incorporated into various other types of battery-operated machines generally. For example, the rechargeable battery system 58 can be incorporated into various stationary machines that may endure cold temperatures.

Advantageously, vehicles 10, 310 may be fully-electric lift devices. All of the electric actuators and electric motors of vehicles 10, 310 can be configured to perform their respective operations without requiring any hydraulic systems, hydraulic reservoir tanks, hydraulic fluids, engine systems, etc. That is, both vehicles 10, 310 may be completely devoid of any hydraulic systems and/or hydraulic fluids generally. Said differently, both vehicles 10, 310 may be devoid of any moving fluids. Traditional lift device vehicles do not use a fully-electric system and require regular maintenance to ensure that the various hydraulic systems are operating properly. As such, the vehicles 10, 310 may use electric motors and electric actuators, which allows for the absence of combustible fuels (e.g., gasoline, diesel) and/or hydraulic fluids. As such, the vehicles 10, 310 may be powered by batteries, such as battery 16, that can be recharged when necessary.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is coupled to the processor to form a processing circuit and includes computer code for executing (e.g., by the processor) the one or more processes described herein.

It is important to note that the construction and arrangement of the vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A method of operating a lift device, the lift device including a drive motor configured to rotate at least one wheel, a steering system, and a linear actuator configured to selectively move a work platform between a raised position and a lowered position, the method comprising:
   receiving, at a controller, current delivery limits and regeneration limits for a battery that powers the drive motor, the steering system, and the linear actuator; and
   limiting an operational speed of the drive motor or the linear actuator based on the current delivery limits and the regeneration limits.

2. The method of claim 1, wherein the current delivery limits and the regeneration limits are received from the drive motor, the steering system, or the linear actuator.

3. The method of claim 1, further comprising:
   operating the lift device in a limited or scaled capacity when normal operational speeds would cause an overcurrent shutdown fault within the battery.

4. The method of claim 1, wherein the operational speed of the drive motor or the linear actuator are limited by limiting a drive speed of the drive motor or a lift speed of the linear actuator to stay within the current delivery limits.

5. The method of claim 1, wherein the operational speed of the drive motor is limited by limiting a drive speed of the drive motor to stay within the current delivery limits.

6. The method of claim 1, wherein the operational speed of the linear actuator is limited by limiting a lift speed of the linear actuator to stay within the current delivery limits.

7. A method of operating a lift device, the lift device including a drive motor configured to rotate at least one wheel, a steering system, and a linear actuator configured to selectively move a work platform between a raised position and a lowered position, the method comprising:
   receiving, from the drive motor, the steering system, and the linear actuator, current delivery limits and regeneration limits for a battery that powers the drive motor, the steering system, and the linear actuator; and
   operating the drive motor, the steering system, and the linear actuator in a restricted mode if a normal mode results in violation of the current delivery limits.

8. The method of claim 7, wherein an operating speed of the drive motor, the steering system, and the linear actuator in the restricted mode is less than an operation speed in the normal mode.

9. The method of claim 7, wherein the lift device is a scissor lift.

10. The method of claim 7, wherein the current delivery limits and the regeneration limits are communicated to a controller via a communication network.

11. The method of claim 10, wherein the battery is a lithium-ion battery.

* * * * *